US011134529B2

(12) United States Patent
Takeuchi

(10) Patent No.: US 11,134,529 B2
(45) Date of Patent: Sep. 28, 2021

(54) COMMUNICATION SYSTEM, NON-TRANSITORY COMPUTER-READABLE RECORDING MEDIUM STORING CONNECTION APPLICATION FOR TERMINAL, AND COMMUNICATION DEVICE

(71) Applicant: BROTHER KOGYO KABUSHIKI KAISHA, Nagoya (JP)

(72) Inventor: Syun Takeuchi, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/006,160

(22) Filed: Aug. 28, 2020

(65) Prior Publication Data

US 2021/0068179 A1    Mar. 4, 2021

(30) Foreign Application Priority Data

Aug. 30, 2019 (JP) .............................. JP2019-158073

(51) Int. Cl.
*H04W 76/14* (2018.01)
*G06F 3/12* (2006.01)
(Continued)

(52) U.S. Cl.
CPC .......... *H04W 76/14* (2018.02); *G06F 3/1236* (2013.01); *G06F 3/1287* (2013.01);
(Continued)

(58) Field of Classification Search
CPC ..... H04W 76/14; H04W 4/029; H04W 12/06; G06F 3/1236; G06F 21/608;
(Continued)

(56) References Cited

U.S. PATENT DOCUMENTS

2012/0110065 A1* 5/2012 Oshima .............. H04N 1/00244
709/203
2013/0326069 A1* 12/2013 Wang .................... H04W 24/02
709/227

(Continued)

FOREIGN PATENT DOCUMENTS

| JP | 2014-116871 A | 6/2014 |
| JP | 2019-013034 A | 1/2019 |
| JP | 2019-029989 A | 2/2019 |

OTHER PUBLICATIONS

Device Provisioning Protocol Technical Specification Version 1.1, Wi-Fi Alliance, 2018.

*Primary Examiner* — Juan M Guillermety
(74) *Attorney, Agent, or Firm* — Scully, Scott, Murphy & Presser, PC

(57) ABSTRACT

A terminal of a communication system may obtain location information of a server of the communication system and related information related to a public key of a communication device of the communication system by using a computer program. The terminal may send a web page request to the server by using a browser program, receive web page data from the server by using the browser program, display as web page by using the browser program and activate the connection application by using the browser program. The terminal may obtain the public key by using the connection application, send an authentication request to the communication device by using the connection application, receive an authentication response from the communication device by using the connection application and execute a target communication with the communication device by using the connection application.

13 Claims, 8 Drawing Sheets

(51) Int. Cl.
  *G06F 21/60* (2013.01)
  *H04W 12/06* (2021.01)
  *H04W 4/029* (2018.01)
  *H04L 9/30* (2006.01)
  *H04L 9/32* (2006.01)

(52) U.S. Cl.
  CPC .............. *G06F 21/608* (2013.01); *H04L 9/30* (2013.01); *H04L 9/321* (2013.01); *H04W 4/029* (2018.02); *H04W 12/06* (2013.01)

(58) Field of Classification Search
  CPC ......... G06F 3/1287; H04L 9/30; H04L 9/321; H04L 9/0841; H04L 9/3226; H04L 9/14
  See application file for complete search history.

(56) References Cited

U.S. PATENT DOCUMENTS

| | | |
|---|---|---|
| 2017/0280488 A1 | 9/2017 | Kawasaki |
| 2020/0154276 A1 | 5/2020 | Minakawa |
| 2021/0067953 A1* | 3/2021 | Miyake ................. H04W 76/10 |

* cited by examiner

FIG. 2
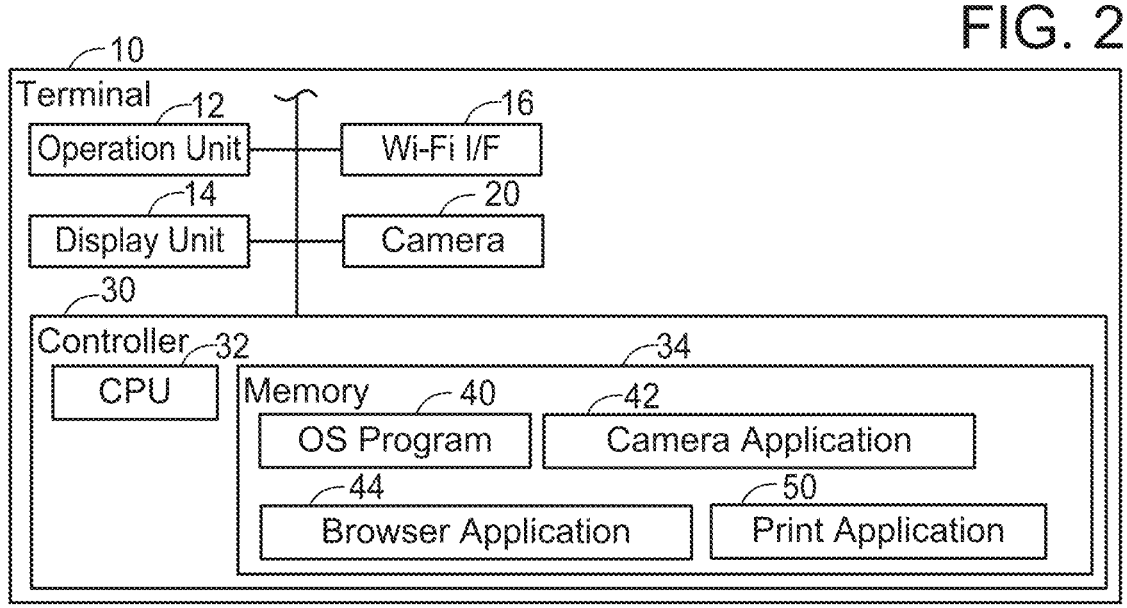
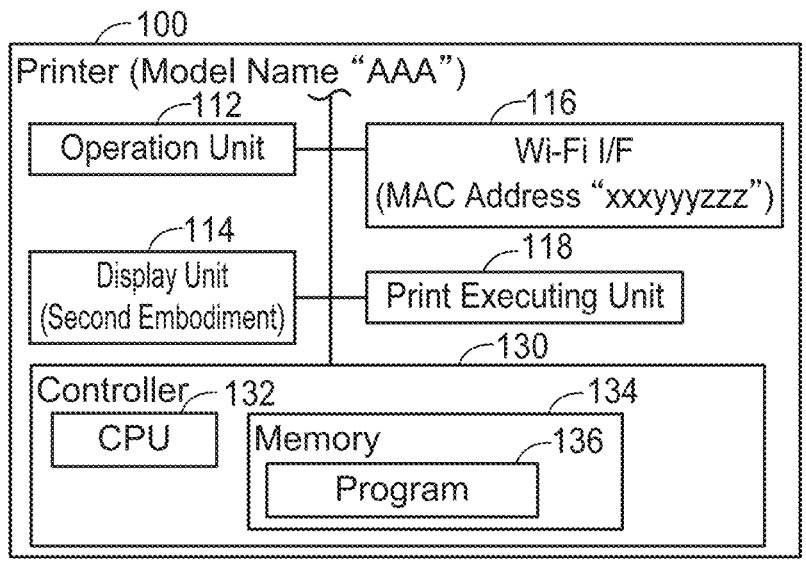
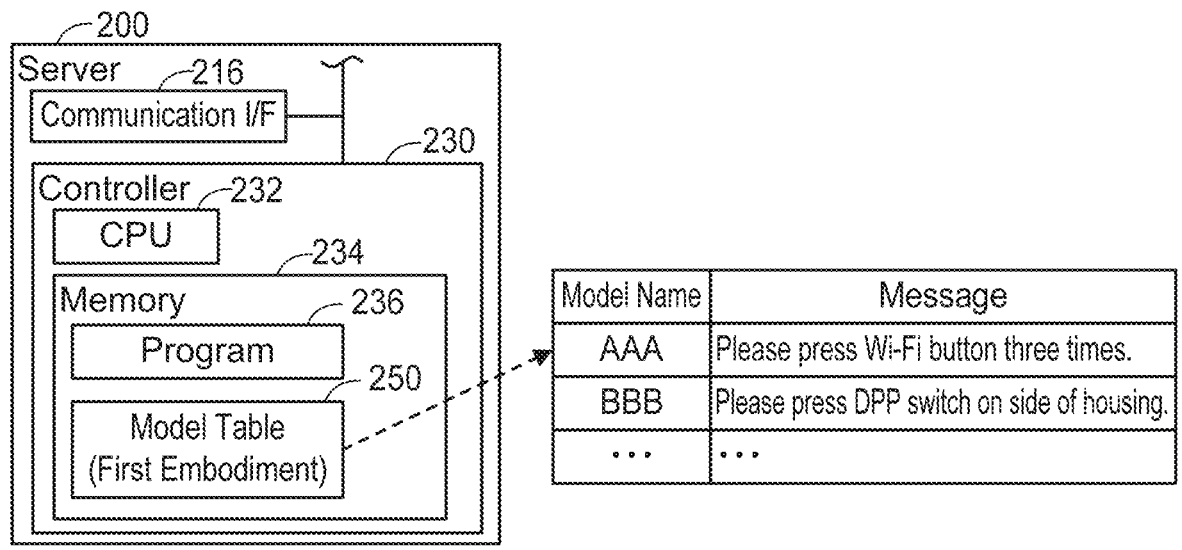

(Outline of DPP)

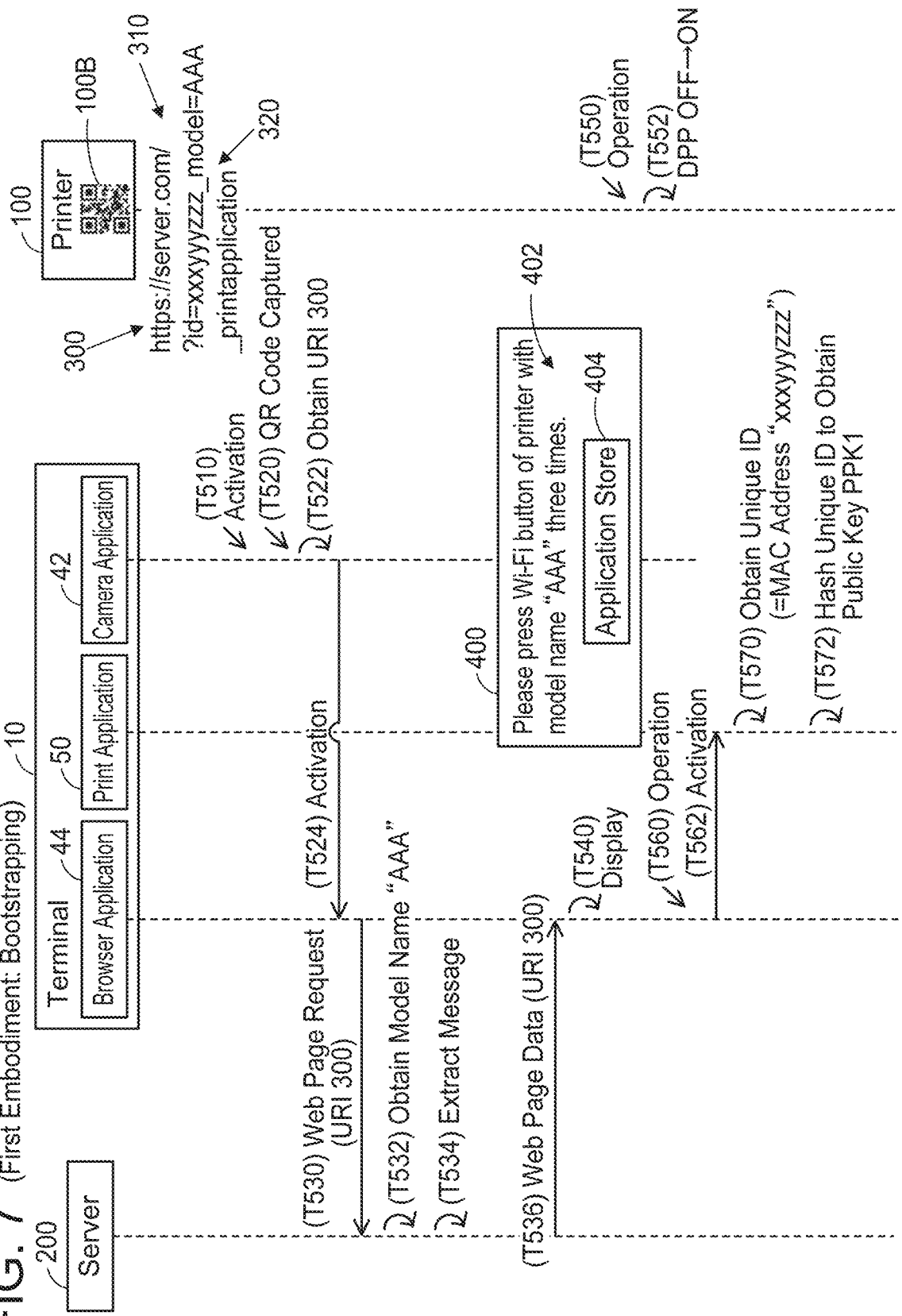
FIG. 7 (First Embodiment: Bootstrapping)

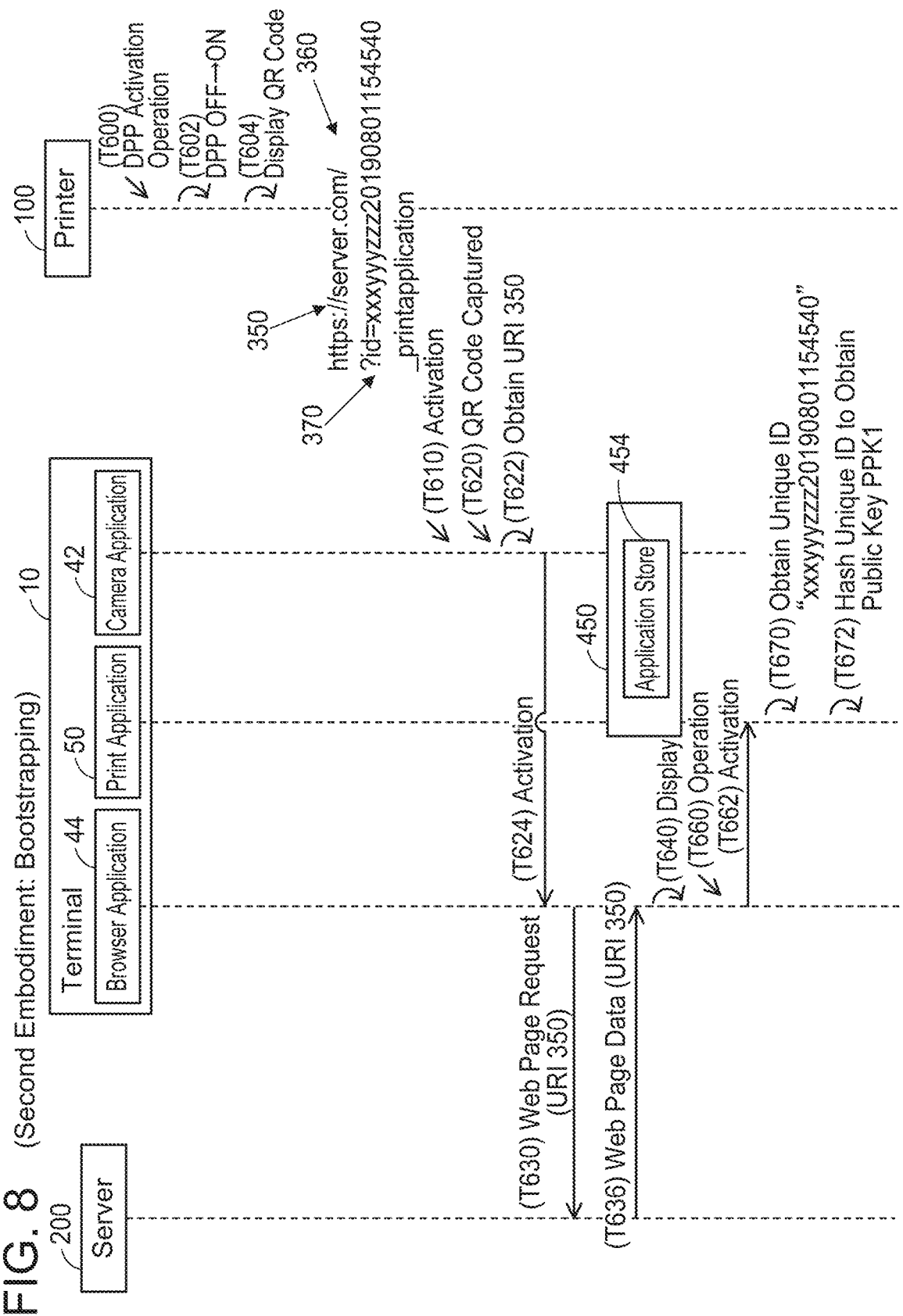

COMMUNICATION SYSTEM, NON-TRANSITORY COMPUTER-READABLE RECORDING MEDIUM STORING CONNECTION APPLICATION FOR TERMINAL, AND COMMUNICATION DEVICE

CROSS-REFERENCE TO RELATED APPLICATION

This application claims priority to Japanese Patent Application No. 2019-158073, filed on Aug. 30, 2019, the entire contents of which are hereby incorporated by reference into the present application.

TECHNICAL FIELD

The disclosure herein discloses art for establishing a wireless connection between a pair of devices.

BACKGROUND ART

Device Provisioning Protocol scheme (hereinbelow termed "DPP scheme"), which is a wireless communication scheme established by the Wi-Fi Alliance, is known. The DPP scheme is a scheme for easily establishing a wireless connection according to Wi-Fi standard between a pair of devices.

SUMMARY

The disclosure herein provides art that enables a user of a terminal to easily establish a wireless connection between a pair of devices by using the terminal.

A communication system disclosed herein may comprise a communication device; a terminal; and a server. The terminal may comprise: a terminal-side wireless interface configured to execute a wireless communication according to a predetermined communication scheme of Wi-Fi standard; a display unit; a terminal-side processor; and a terminal-side memory storing a computer program, a browser program, and a connection application for establishing a wireless connection between a pair of devices. The computer program may include computer-readable instructions configured to, when executed by the terminal-side processor, cause the terminal to: obtain location information of the server and related information related to a public key of the communication device. The browser program may include computer-readable instructions configured to, when executed by the terminal-side processor, cause the terminal to: send a web page request including at least the location information to the server; receive web page data corresponding to the location information from the server in response to the web page request being sent to the server; display a web page represented by the web page data on the display unit; and activate the connection application in a case where a predetermined operation is accepted on the web page. The connection application may include computer-readable instructions configured to, when executed by the terminal-side processor, cause the terminal to: obtain the public key related to the related information; send an authentication request according to the predetermined communication scheme to the communication device via the terminal-side wireless interface, the public key being used in the authentication request; receive an authentication response according to the predetermined communication scheme from the communication device via the terminal-side wireless interface in response to the authentication request being sent to the communication device; and in a case where the authentication response is received from the communication device, execute a target communication according to the predetermined communication scheme with the communication device via the terminal-side wireless interface, the target communication being for establishing a wireless connection between a pair of devices.

The disclosure herein further discloses a non-transitory computer-readable recording medium storing a connection application for a terminal. The terminal may comprise: a terminal-side wireless interface configured to execute a wireless communication according to a predetermined communication scheme of Wi-Fi standard; a display unit; a terminal-side processor; and a terminal-side memory storing a computer program, a browser program, and the connection application for establishing a wireless connection between a pair of devices. The computer program may include computer-readable instructions configured to, when executed by the terminal-side processor, cause the terminal to: obtain location information of a server and related information related to a public key of a communication device. The browser program may include computer-readable instructions configured to, when executed by the terminal-side processor, cause the terminal to: send a web page request including at least the location information to the server; receive web page data corresponding to the location information from the server in response to the web page request being sent to the server; display a web page represented by the web page data on the display unit; and activate the connection application in a case where a predetermined operation is accepted on the web page. The connection application may include computer-readable instructions configured to, when executed by the terminal-side processor, cause the terminal to: obtain the public key related to the related information; send an authentication request according to the predetermined communication scheme via the terminal-side wireless interface, the public key being used in the authentication request; receive an authentication response according to the predetermined communication scheme from the communication device via the terminal-side wireless interface in response to the authentication request being sent to the communication device; and in a case where the authentication response is received from the communication device, execute a target communication according to the predetermined communication scheme with the communication device via the terminal-side wireless interface, the target communication being for establishing a wireless connection between a pair of devices.

The disclosure herein further discloses a communication device. The communication device may comprise a device-side wireless interface configured to execute a wireless communication according to a predetermined communication scheme of Wi-Fi standard; a housing to which a sticker indicating a code image is attached, wherein the code image is obtained by coding location information of a server and related information related to a public key of the communication device, the location information is used for a terminal to receive web page data from the server and to display a web page represented by the web page data, in a case where a predetermined operation is accepted on the web page, a connection application installed in the terminal is activated, and the connection application is for obtaining the public key related to the related information and establishing a wireless connection between a pair of devices; a device-side processor; and a device-side memory storing computer-readable instructions therein, wherein the computer-readable instructions are configured to, when executed by the device-side processor, cause the communication device to: receive an authentication request according to the predetermined communication scheme via the device-side wireless interface from the terminal that has obtained the public key, the public key being used in the authentication request; in a case where the authentication request is received from the terminal, send an authentication response to the terminal via the device-side wireless interface; and in a case where the authentication response is sent to the terminal, execute a target communication according to the predetermined communication scheme with the terminal via the device-side wireless interface, the target communication being for establishing a wireless connection between a pair of devices.

The disclosure herein further discloses another communication device. The communication device may comprise a device-side wireless interface configured to execute a wireless communication according to a predetermined communication scheme of Wi-Fi standard; a device-side processor; and a device-side memory storing computer-readable instructions therein, wherein the computer-readable instructions are configured to, when executed by the device-side processor, cause the communication device to: execute an output control process for externally outputting location information of a server and related information related to a public key of the communication device, wherein the location information is used for a terminal to receive web page data from the server and to display a web page represented by the web page data, in a case where a predetermined operation is accepted on the web page, a connection application installed in the terminal is activated, and the connection application is for obtaining the public key related to the related information and establishing a wireless connection between a pair of devices; receive an authentication request according to the predetermined communication scheme via the device-side wireless interface from the terminal that has obtained the public key, the public key being used in the authentication request; in a case where the authentication request is received from the terminal, send an authentication response to the terminal via the device-side wireless interface; and in a case where the authentication response is sent to the terminal, execute a target communication according to the predetermined communication scheme with the terminal via the device-side wireless interface, the target communication being for establishing a wireless connection between a pair of devices.

The terminal above itself and a method executed by the terminal above are also novel and useful. A non-transitory computer-readable recording medium storing the connection application above is also novel and useful. Further, methods executed by the communication devices above, computer programs for realizing the communication devices above, and non-transitory computer-readable recording mediums storing these computer programs are also novel and useful.

BRIEF DESCRIPTION OF THE DRAWINGS

FIG. 2 shows control configurations of respective devices.

FIG. 7 shows a sequence diagram of a Bootstrapping process of a first embodiment.

FIG. 8 shows a sequence diagram of a Bootstrapping process of a second embodiment.

EMBODIMENTS

Figure 1:
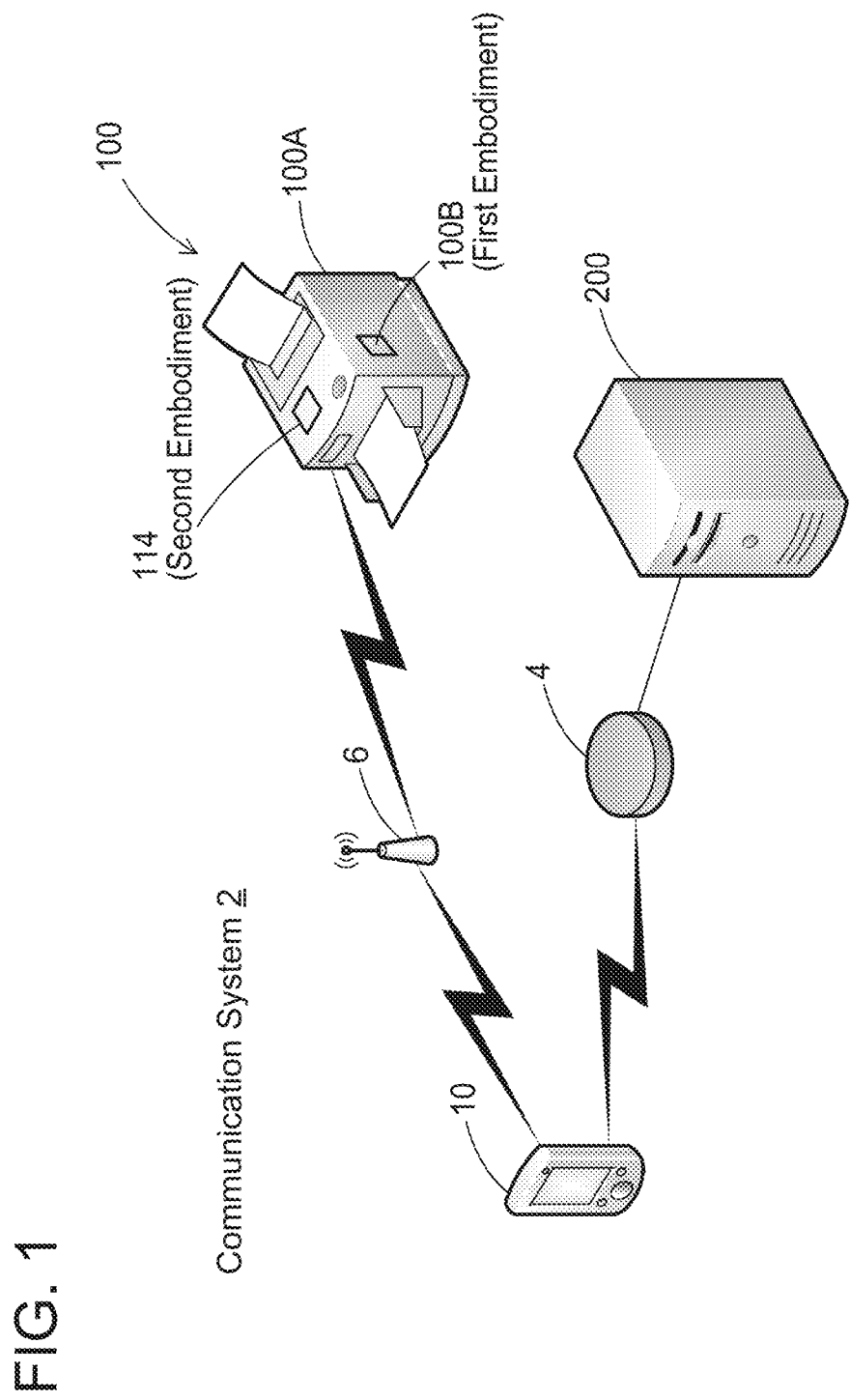
FIG. 1 shows a schematic configuration of a communication system.

First Embodiment (Configuration of Communication System 2: FIG. 1)

As shown in FIG. 1, a communication system 2 is provided with an access point (hereinbelow simply termed "AP") 6, a terminal 10, a printer 100, and a server 200. This embodiment assumes a situation in which a user uses the terminal 10 to establish a wireless connection according to Wi-Fi standard (hereinbelow termed "Wi-Fi connection") between the printer 100 and the AP 6.

(Configuration of Terminal 10: FIG. 2)

The terminal 10 is a portable terminal such as a portable phone (e.g., smartphone), a PDA, or a tablet PC. In a variant, the terminal 10 may be a stationary terminal. As shown in FIG. 2, the terminal 10 is provided with an operation unit 12, a display unit 14, a Wi-Fi interface 16, a camera 20, and a controller 30. The respective units 10 to 30 are connected to a bus line (reference sign omitted). Hereinbelow, the interface will simply be denoted as "I/F".

The operation unit 12 is provided with a plurality of buttons. The user can input various instructions to the terminal 10 by operating the operation unit 12. The display unit 14 is a display configured to display various types of information. The display unit 14 further functions as a so-called touch panel (i.e., an operation unit). The camera 20 is a device configured to capture images of objects, and in this embodiment, it is used to capture a QR code (registered trademark) for the AP 6 and the printer 100.

The Wi-Fi I/F 16 is a wireless interface configured to execute wireless communication according to the Wi-Fi standard. The Wi-Fi standard is for executing wireless communication according to, for example, 802.11 standard of the IEEE (The Institute of Electrical and Electronics Engineers, Inc.) and standards complying with it (such as 802.11a, 11b, 11g, 11n). The terminal 10 is capable of establishing a Wi-Fi connection with the AP 6 via the Wi-Fi I/F 16 by using an SSID (Service Set Identifier) and a password of a wireless network formed by the AP 6.

Further, the Wi-Fi I/F 16 supports a DPP (Device Provisioning Protocol) scheme established by the Wi-Fi Alliance. The DPP scheme is described in the specification "Device Provisioning Protocol Technical Specification Version 1.0" created by the Wi-Fi Alliance, and is a scheme for easily establishing a Wi-Fi connection between a pair of devices (such as the printer 100 and the AP 6) by using the terminal 10.

The controller 30 is provided with a CPU 32 and a memory 34. The CPU 32 is configured to execute various processes in accordance with programs 40 to 50 stored in the memory 34. The memory 34 is constituted of a volatile memory, a nonvolatile memory, and the like. The memory 34 stores an OS program 40, a camera application 42, a browser application 44, and a print application 50. Hereinbelow, the OS program will simply be termed "OS", and the applications may simply be termed "app".

The OS 40 is a program for realizing basic operations of the terminal 10. The OS 40 is preinstalled in the terminal 10 at a timepoint of shipping the terminal 10. The camera application 42 is a program for realizing operations related to the camera 20. The browser application 44 is a program for displaying a web page. These applications 42, 44 may be preinstalled in the terminal 10 at the timepoint of shipping the terminal 10, or may be installed in the terminal 10 after the shipping of the terminal 10. The print application 50 is a program for establishing a Wi-Fi connection between the printer 100 and the AP 6 by executing wireless communication according to the DPP scheme. Further, the print application 50 is a program for causing the printer 100 to execute printing by using the Wi-Fi connection. The print application 50 is a program provided by a vendor of the printer 100, and is installed in the terminal 10 after the shipping of the terminal 10.

(Configuration of Printer 100: FIGS. 1 and 2)

The printer 100 is a peripheral device capable of executing a print function (such as a peripheral device of the terminal 10). The printer 100 has a model name "AAA". As shown in FIG. 1, the printer 100 is provided with a housing 100A. The housing 100A has a sticker 100B indicating a QR code attached thereon. The QR code is information obtained by coding a Uniform Resource Identifier (URI) that includes location information of the server 200, a unique ID related to a public key of the printer 100, the model name "AAA" of the printer 100, and information for identifying the print application 50.

As shown in FIG. 2, the printer 100 is provided with an operation unit 112, a Wi-Fi I/F 116, a print executing unit 118, and a controller 130. The respective units 112 to 130 are connected to a bus line (reference sign omitted). The printer 100 of the present embodiment is not provided with a display unit capable of displaying the QR code. This includes that the printer 100 is not provided with any display unit and that the printer 100 is provided with a very small display unit.

The operation unit 112 is provided with a plurality of buttons. The user can input various instructions to the printer 100 by operating the operation unit 112. The Wi-Fi I/F 116 supports the DPP scheme. A MAC address "xxxyyyzzz" is allocated to the Wi-Fi I/F 116. The print executing unit 118 is provided with a print mechanism of an inkjet scheme or a laser scheme, for example. The controller 130 is provided with a CPU 132 and a memory 134. The CPU 132 is configured to execute various processes in accordance with a program 136 stored in the memory 134. The memory 134 is constituted of a volatile memory, a nonvolatile memory, and the like.

(Configuration of Server 200: FIG. 2)

The server 200 is a so-called web server, and is provided on the Internet 4 (see FIG. 1) by the vendor of the printer 100. The server 200 is provided with a communication I/F 216 and a controller 230. The respective units 216 and 230 are connected to a bus line (reference sign omitted). The communication I/F 216 is connected to the Internet 4. The controller 230 is provided with a CPU 232 and a memory 234. The CPU 232 is configured to execute various processes in accordance with a program 236 stored in the memory 234. The memory 234 is constituted of a volatile memory, a nonvolatile memory, and the like.

The memory 234 further stores a model table 250. In the model table 250, a model name of a printer and a message indicating a change operation for changing a state of the printer with the model name from a DPP OFF state to a DPP ON state are associated with each other, for each of a plurality of model names of printers. The DPP OFF state and the DPP ON state are respectively a state in which wireless communication according to the DPP scheme is incapable of being executed and a state in which wireless communication according to the DPP scheme is capable of being executed.

Figure 3:
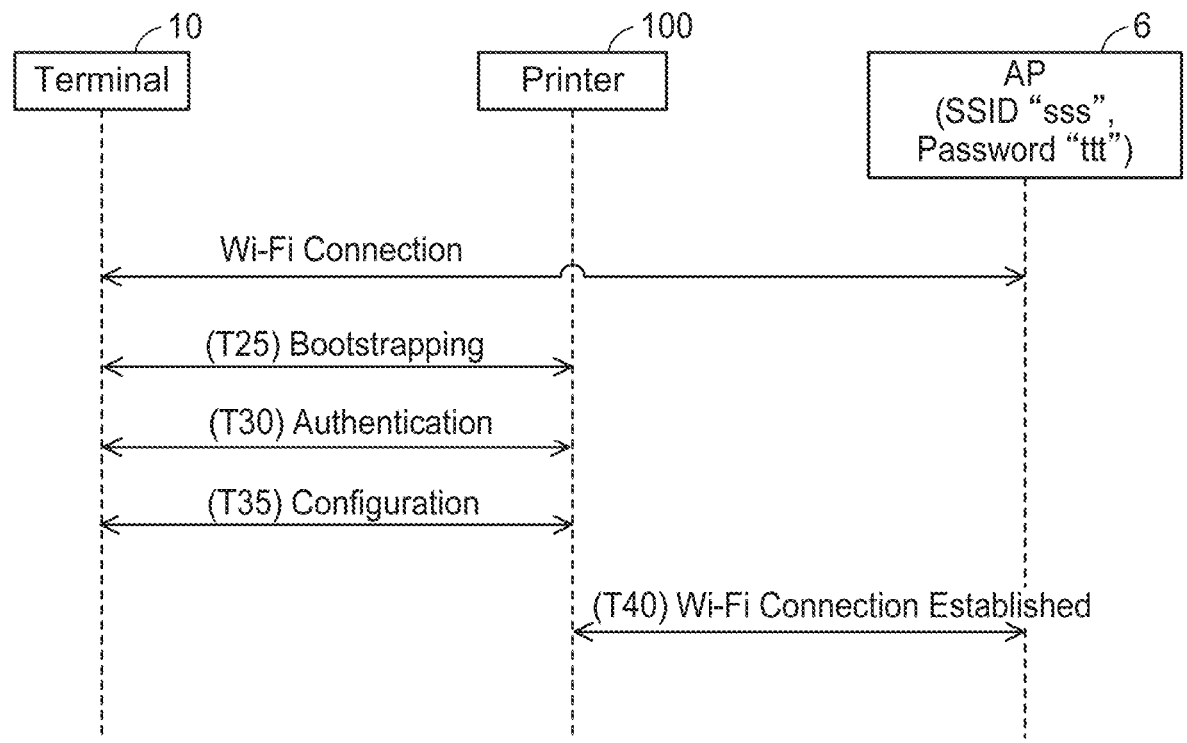
FIG. 3 shows a schematic sequence diagram of a process for establishing a Wi-Fi connection between a printer and an access point.

(Outline of DPP: FIG. 3)

Next, an outline of the DPP will be described with reference to FIG. 3. Hereinbelow, for easier understanding, operations executed by the CPUs (such as the CPU 32) of the respective devices will be described with the devices (such as the terminal 10) as the subject of action, instead of describing the operations with the CPUs as the subject of action. Further, since communications that will be described hereinbelow are basically executed by using the I/Fs 16, 116, 216 (see FIG. 2), the description of "via the I/F" will be omitted unless it is otherwise necessary.

In the present embodiment, the AP 6 does not support the DPP scheme. The AP 6 operates as a parent station in a wireless network in which an SSID "sss" and a password "ttt" are used. For example, the user of the terminal 10 may input the SSID "sss" and the password "ttt" to the terminal 10 by operating the operation unit 12. In this case, the terminal 10 establishes a Wi-Fi connection with the AP 6 by using the OS 40. That is, the terminal 10 can establish the Wi-Fi connection with the AP 6 by using the OS 40, without executing wireless communication according to the DPP scheme by using the print application 50. The case of FIG. 3 assumes a situation in which a Wi-Fi connection has been already established between the terminal 10 and the AP 6 as described. If the user of the terminal 10 wishes to cause the printer 100 to execute printing, the user establishes a Wi-Fi connection between the printer 100 and the AP 6 to cause communication to be executed between the terminal 10 and the printer 100 via the AP 6. In order to realize this, the following processes are executed.

In T25, the terminal 10 executes Bootstrapping (hereinbelow simply termed "BS") of the DPP scheme with the printer 100. This BS is a process of providing information, which is to be used in Authentication (hereinbelow simply termed "Auth") of T30 as described later, from the printer 100 to the terminal 10 in response to the terminal 10 capturing the QR code of the sticker 100B attached to the printer 100 (see FIG. 1).

In T30, the terminal 10 uses the information obtained in the BS of T25 to execute the Auth of the DPP scheme with the printer 100. This Auth is a process for each of the terminal 10 and the printer 100 to authenticate its communication counterpart.

In T35, the terminal 10 executes Configuration (hereinbelow simply termed "Config") of the DPP scheme with the printer 100. This Config is a process of sending, to the printer 100, information for establishing a Wi-Fi connection between the printer 100 and the AP 6. Specifically, the terminal 10 generates a printer Configuration Object (hereinbelow, Configuration Object will simply be termed "CO") and sends this printer CO to the printer 100. The printer CO includes the SSID "sss" and the password "ttt" of the AP 6.

In T40, the printer 100 uses the SSID "sss" and the password "ttt" included the printer CO obtained in T35 to establish a Wi-Fi connection with the AP 6. Specifically, the printer 100 firstly sends a Probe request by broadcast and receives a Probe response from each of one or more APs including the AP 6 that are present around the printer 100. In this case, the printer 100 recognizes that the one or more Probe responses received from the one or more APs include a Probe response that includes the SSID "sss" in the printer CO (i.e., the SSID "sss" of the AP 6). Then, the printer 100 executes various communications, such as Association and 4-way handshake, with the AP 6 to establish a Wi-Fi connection with the AP 6. In the course of the various communications, the printer 100 sends authentication information in which the password "ttt" included in the printer CO is used to the AP 6, and the AP 6 then executes authentication of the password "ttt". In a case where this authentication is successful, a Wi-Fi connection is established between the printer 100 and the AP 6.

As a result of the above processes, both the terminal 10 and the printer 100 are brought to participate in the same wireless network formed by the AP 6 as child stations. Due to this, the terminal 10 can send print data representing an image to be printed to the printer 100 via the AP 6, for example. Then, the printer 100 can execute printing of the image represented by the print data.

With the DPP scheme, the user does not have to input the SSID "sss" and the password "ttt" of the AP 6 to the printer 100 to establish the Wi-Fi connection between the printer 100 and the AP 6. This enables easy establishment of the Wi-Fi connection between the printer 100 and the AP 6 for the user.

Figure 4:
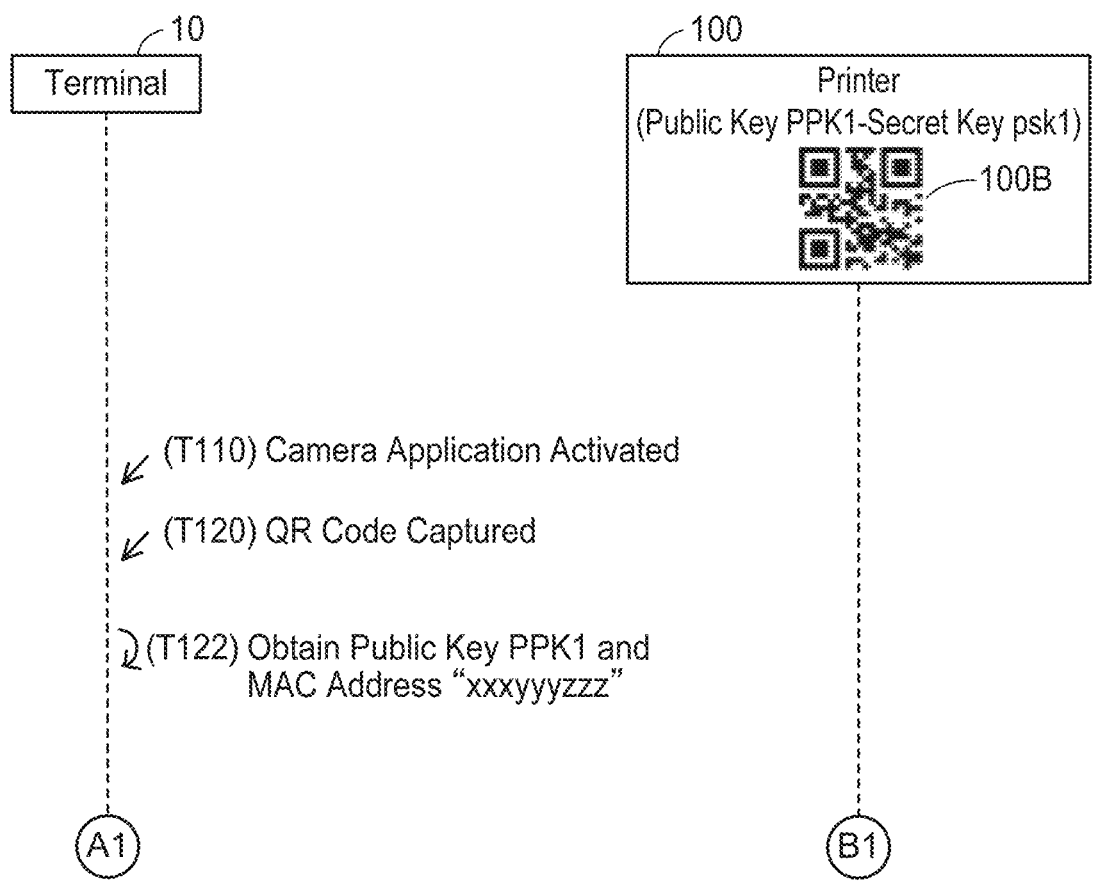
FIG. 4 shows a sequence diagram of a Bootstrapping process.
Figure 5:
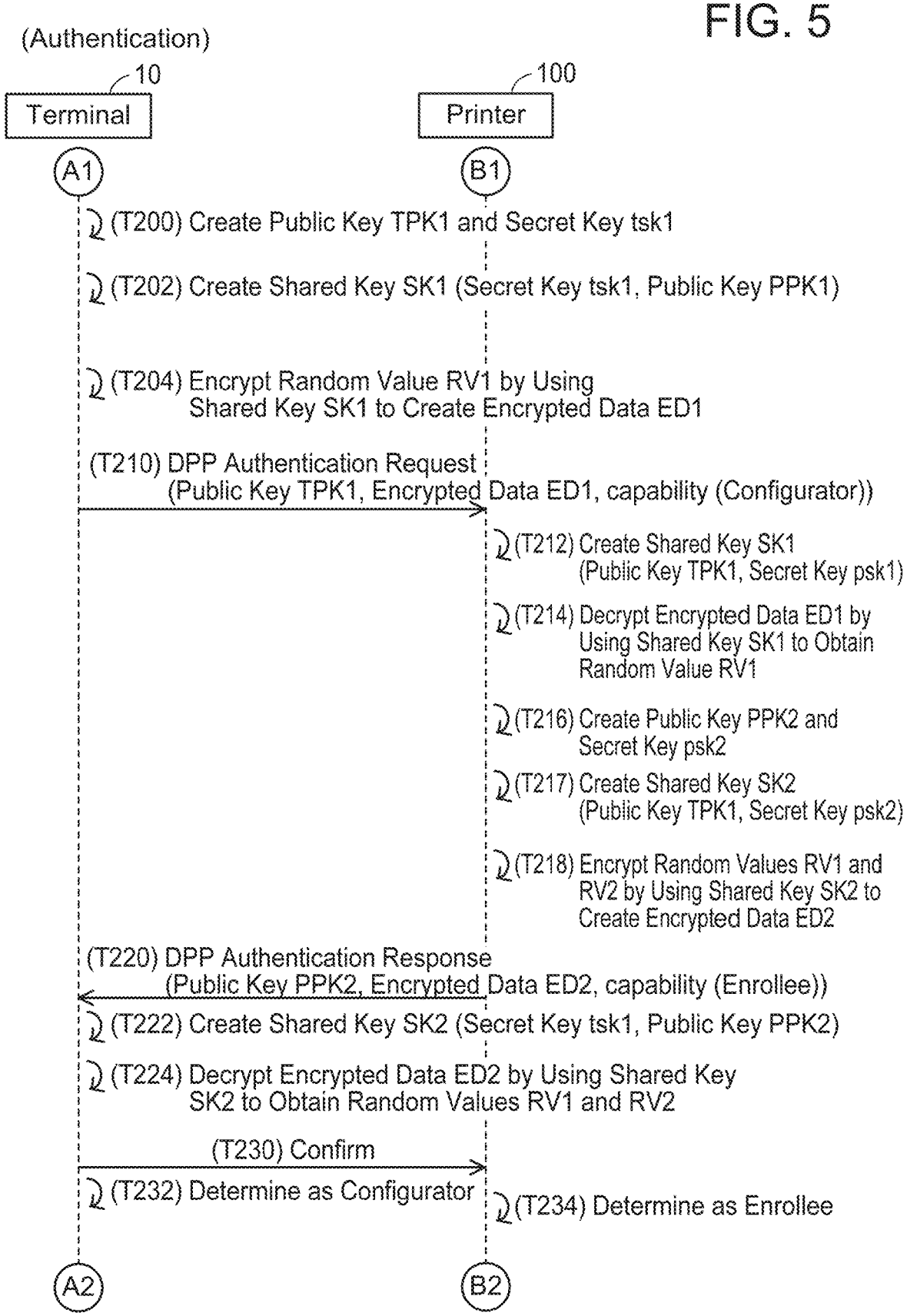
FIG. 5 shows a sequence diagram of an Authentication process.
Figure 6:
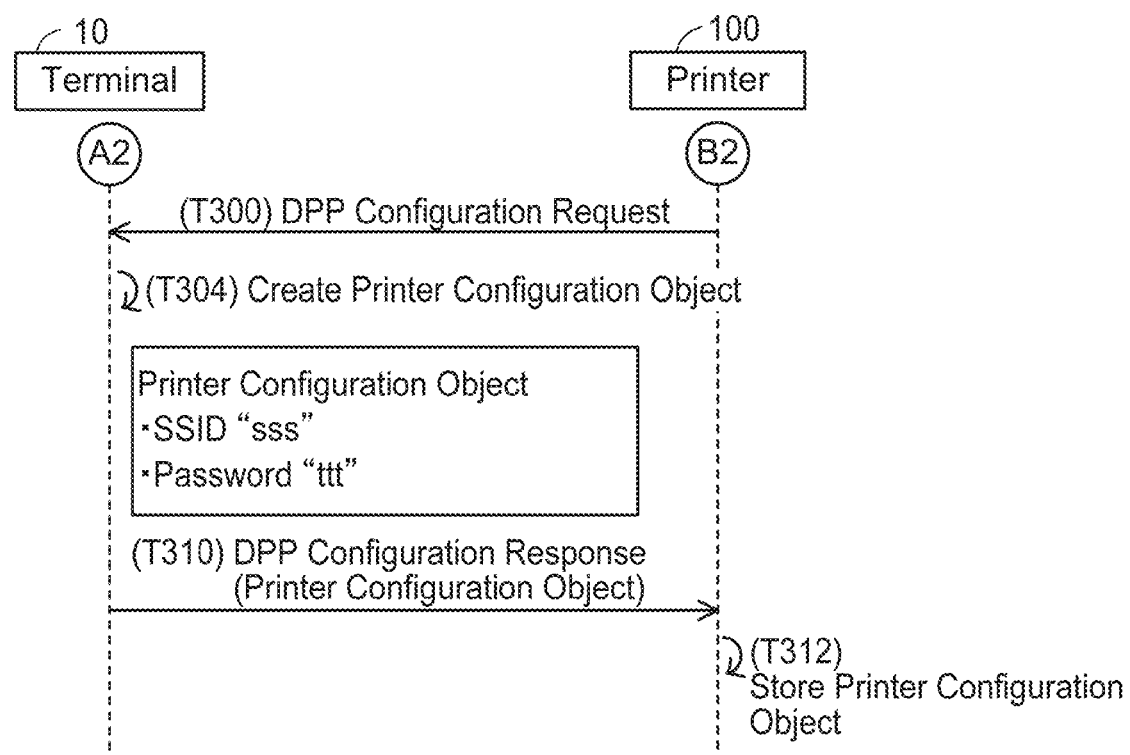
FIG. 6 shows a sequence diagram of a Configuration process.

(Details of Respective Processes: FIGS. 4 to 6)

Next, details of the respective processes executed in T25 to T35 of FIG. 3 will be described with reference to FIGS. 4 to 6.

(Bootstrapping (BS): FIG. 4)

Firstly, the BS process executed in T25 of FIG. 3 will be described with reference to FIG. 4. In an initial state of FIG. 4, the memory 134 of the printer 100 has already stored a public key PPK1 and a secret key psk1 of the printer 100.

The user activates the camera application 42 of the terminal 10 in T110, and captures the QR code of the sticker 100B of the printer 100 by using the camera 20 in T120. Then, the terminal 10 decodes the captured QR code in T122 to obtain the public key PPK1 and the MAC address "xxxyyyzzz". The details of this process will be described later with reference to FIG. 7. When the process of T122 is completed, the process of FIG. 4 is terminated. By the time when the process of FIG. 4 terminates, the state of the printer 100 has already been changed from the DPP OFF state to the ON state. The details of this will also be described later.

(Authentication (Auth): FIG. 5)

Next, the Auth process executed between the terminal 10 and the printer 100 in T30 of FIG. 3 will be described with reference to FIG. 5.

In T200, the terminal 10 creates a public key TPK1 and a secret key tsk1 of the terminal 10. Next, in T202, the terminal 10 creates a shared key SK1 according to Elliptic curve Diffie-Hellman key exchange (ECDH) by using the created secret key tsk1 and the public key PPK1 of the printer 100 obtained in T122 of FIG. 4. Then, in T204, the terminal 10 creates encrypted data ED1 by using the created shared key SK1 to encrypt a random value RV1.

In T210, the terminal 10 sends a DPP Authentication Request (hereinbelow simply termed "AReq") to the printer 100 with the MAC address "xxxyyyzzz" obtained in T122 of FIG. 4 as its destination. The AReq is a signal that requests the printer 100 to execute authentication. The AReq includes the public key TPK1 of the terminal 10 created in T200, the encrypted data ED1 created in T204, and a capability of the terminal 10.

The capability is pre-designated information in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating as whichever one of the Configurator and the Enrollee. The Configurator refers to a device configured to send a CO to an Enrollee in the Config in T35 of FIG. 3. On the other hand, the Enrollee refers to the device that receives the CO from the Configurator in the Config. In this embodiment, the capability of the terminal 10 includes the value indicating that the terminal 10 is capable of operating only as the Configurator.

The printer 100 receives the AReq from the terminal 10 in T210. As described above, the AReq is sent with the MAC address "xxxyyyzzz" of the printer 100 as the destination. As such, the printer 100 can suitably receive this AReq from the terminal 10.

Next, the printer 100 executes the following processes for authenticating the sender of the AReq (that is, the terminal 10). Specifically, in T212, the printer 100 creates a shared key SK1 according to the ECDH by using the public key TPK1 of the terminal 10 in the AReq and the secret key psk1 of the printer 100. Here, the shared key SK1 created by the terminal 10 in T202 and the shared key SK1 created by the printer 100 in T212 are identical to each other. Thus, in T214, the printer 100 can suitably decrypt the encrypted data ED1 in the AReq by using the created shared key SK1, as a result of which it can obtain the random value RV1. In a case where the decryption of the encrypted data ED1 succeeds, the printer 100 determines that the sender of the AReq is the device with which the QR code of the printer 100 has been captured, that is, determines that the authentication succeeded, and executes subsequent processes from T216. On the other hand, in a case where the decryption of the encrypted data ED1 does not succeed, the printer 100 determines that the sender of the AReq is not the device with which the QR code of the printer 100 has been captured, that is, determines that the authentication failed, and does not execute the subsequent processes from T216.

In T216, the printer 100 creates a new public key PPK2 and a new secret key psk2 of the printer 100. In a variant, the printer 100 may store the public key PPK2 and the secret key psk2 in advance. Next, in T217, the printer 100 creates a shared key SK2 according to the ECDH by using the public key TPK1 of the terminal 10 in the AReq of T210 and the created secret key psk2 of the printer 100. Then, in T218, the printer 100 creates encrypted data ED2 by using the created shared key SK2 to encrypt the obtained random value RV1 and a new random value RV2.

In T220, the printer 100 sends a DPP Authentication Response (hereinbelow simply termed "ARes") to the terminal 10. This ARes includes the public key PPK2 of the printer 100 created in T216, the encrypted data ED2 created in T218, and a capability of the printer 100. This capability includes the value indicating that the printer 100 is capable of operating only as the Enrollee.

In response to receiving the ARes from the printer 100 in T220, the terminal 10 executes the following processes for authenticating the sender of the ARes (that is, the printer 100). Specifically, in T222, the terminal 10 creates a shared key SK2 according to the ECDH by using the secret key tsk1 of the terminal 10 created in T200 and the public key PPK2 of the printer 100 in the ARes. Here, the shared key SK2 created by the printer 100 in T217 and the shared key SK2 created by the terminal 10 in T222 are identical to each other. Thus, in T224, the terminal 10 can suitably decrypt the encrypted data ED2 in the ARes by using the created shared key SK2, as a result of which it can obtain the random values RV1 and RV2. In a case where the decryption of the encrypted data ED2 succeeds, the terminal 10 determines that the sender of the ARes is the device with the captured QR code, that is, determines that the authentication succeeded, and executes subsequent processes from T230. On the other hand, in a case where the decryption of the encrypted data ED2 does not succeed, the terminal 10 determines that the sender of the ARes is not the device with the captured QR code, that is, determines that the authentication failed, and does not execute the subsequent processes from T230.

In T230, the terminal 10 sends a Confirm to the printer 100. The Confirm includes information indicating that the terminal 10 operates as the Configurator and the printer 100 operates as the Enrollee. As a result, the terminal 10 determines to operate as the Configurator in T232, and the printer 100 determines to operate as the Enrollee in T234. When the process of T234 is completed, the process of FIG. 5 is terminated.

(Configuration (Config): FIG. 6)

Next, the Config process executed between the terminal 10 and the printer 100 in T35 of FIG. 3 will be described with reference to FIG. 6.

In T300, the printer 100 sends a DPP Configuration Request (hereinbelow simply termed "CReq") to the terminal 10. The CReq is a signal that requests sending of a printer CO.

The terminal 10 receives the CReq from the printer 100 in T300. In this case, the terminal 10 creates a printer CO including the SSID "sss" and the password "ttt" of the AP 6 in T304. Then, in T310, the terminal 10 sends a DPP Configuration Response (hereinbelow simply termed "CRes") including the printer CO to the printer 100.

The printer 100 receives the CRes from the terminal 10 in T310. In this case, in T312, the printer 100 stores the printer CO in the CRes. When the process of T312 is completed, the process of FIG. 6 is terminated. After this, a Wi-Fi connection is established between the printer 100 and the AP 6 in T40 of FIG. 3 as described above.

The terminal 10 can establish a Wi-Fi connection with the AP 6 by using the OS 40, without using the applications 42, 44, 50 (the initial state of FIG. 3). On the other hand, in order to execute the wireless communication according to the DPP scheme (i.e., T30 and T35 of FIG. 3) with the printer 100, the terminal 10 needs to use the print application 50. Due to this, the print application 50 needs to be activated in the terminal 10. To activate the print application 50, the user may select an icon corresponding to the print application from among a plurality of icons corresponding to a plurality of applications displayed in the terminal 10, for example. However, if the user is not knowledgeable on wireless communication, it may be difficult for the user to perform such an operation. In this embodiment, the process of FIG. 7 as below is executed in order to enable easy activation of the print application 50.

(Details of BS: FIG. 7)

Details of the BS in T25 of FIG. 3 (i.e., the BS of FIG. 4) will be described with reference to FIG. 7. Hereinbelow, processes executed by the respective applications 42, 44, 50 of the terminal 10 will be described with the applications as the subjects of action.

In the present embodiment, the QR code indicated by the sticker 100B of the printer 100 is created by coding a URI 300. The URI 300 includes a location character string 310 and a query string 320. The location character string 310 includes location information "server.com" of the server 200. Here, a query refers to a character string following a symbol "?" in the entire character string constituting a URI.

The query string 320 includes a character string "id=xxxyyyzzz" indicating a unique ID "xxxyyyzzz" of the printer 100, a character string "model=AAA" indicating the model name "AAA" of the printer 100, and a character string "printapplication" identifying the print application 50. Unique IDs are IDs that are uniquely allocated to a plurality of printers including the printer 100 respectively. In the present embodiment, a unique ID is a MAC address. That is, the unique ID of the printer 100 is the MAC address "xxxyyyzzz" of the printer 100.

T510 and T520 are similar to T110 and T120 of FIG. 4. In T522, the camera application 42 obtains the URI 300 by decoding the QR code captured in T520, and supplies the URI 300 to the OS 40. The OS 40 obtains the URI 300 from the camera application 42 and then activates the browser application 44, which is an application that is to use the URI 300. As above, the camera application 42 supplies the URI 300 to the OS 40, and the OS 40 activates the browser application 44. This is equivalent to that the camera application 42 activates the browser application 44 via the OS 40. As such, in FIG. 7, an arrow of T524 indicates that the camera application 42 activates the browser application 44. Although these two applications are linked via the OS 40, depiction for the operation of the OS 40 is omitted in FIG. 7. This applies similarly to FIG. 8 of a second embodiment to be described later.

When activated in T524, the browser application 44 sends a web page request including the URI 300 to the server 200 in T530. For example, in a case where the Wi-Fi I/F 16 is connected to a router (such as the AP 6) for realizing Internet communication, the browser application 44 sends the web page request to the server 200 via the Wi-Fi I/F 16. For example, in a case where the Wi-Fi I/F 16 is not connected to a router, the browser application 44 can send the web page request to the server 200 via a cellular I/F (not shown). Here, the cellular I/F is an I/F configured to execute 4G or 5G communication, for example.

When receiving the web page request from the terminal 10 in T530, the server 200 obtains the model name "AAA" from the query string 320 in the URI 300 included in the web page request in T532. Then, in T534, the server 200 extracts a message "Please press Wi-Fi button three times." associated with the obtained model name "AAA" from the model table 250 (see FIG. 2) in the memory 234. Further, the server 200 obtains the character string "printapplication" identifying the print application 50 from the query string 320. Then, the server 200 creates web page data representing a web page that includes the extracted message and an application store button associated with the obtained character string "printapplication". The web page data further includes the URI 300. Then, in T536, the server 200 sends the created web page data to the terminal 10.

When receiving the web page data from the server 200 in T536, the browser application 44 displays a web page 400 represented by the web page data on the display unit 14 in T540. The web page 400 includes a message 402 and an application store button 404.

In T550, the user presses a Wi-Fi button (not shown) provided in the operation unit 112 of the printer 100 three times as instructed by the message 402 in the web page 400. In this case, the printer 100 changes from the DPP OFF state to the DPP ON state in T552. Specifically, the printer 100 (i.e., the CPU 132) supplies an instruction for changing from the DPP OFF state to the DPP ON state to the Wi-Fi I/F 116. Due to this, the printer 100 is brought to the state capable of executing communication according to the DPP scheme (such as sending an ARes (see T220 of FIG. 5)). As above, according to the present embodiment, the web page 400 includes the message 402 for changing the state of the printer 100 with the model name "AAA" to the DPP ON state, thus the user can easily change the state of the state of the printer 100 to the DPP ON state. Due to this, the user can suitably change the state of the printer 100 to the DPP ON state. If, on the other hand, the printer 100 is maintained in the DPP OFF state, the printer 100 cannot send an ARes to the terminal 10. In this case, the Auth fails and a Wi-Fi connection cannot be established between the printer 100 and the AP 6.

The application store button 404 in the web page 400 is a button for accessing a so-called application store. The application store is a web page for installing various applications including the print application 50 to the terminal 10. In T560, the user performs an operation of selecting the application store button. In a case of accepting the operation of selecting the application store button, the browser application 44 firstly determines whether the print application 50, which is identified by the character string "printapplication" associated with the application store button, has been already installed. In a case of determining that the print application 50 has been already installed, the browser application 44 activates the print application 50 via the OS 40 in T562.

On the other hand, in a case of determining that the print application 50 has not been installed yet, the browser application 44 displays a predetermined web page of the application store, and downloads and installs the print application 50 in response to an instruction from the user. After this, the browser application 44 activates the print application 50 via the OS 40 in T562.

In T570, the print application 50 firstly obtains the URI 300 included in the web page data by using a URI scheme. Specifically, the web page data includes an instruction for executing the URI scheme, and the browser application 44 obtains the URI 300 from the web page data in accordance with this instruction and supplies the URI 300 to the print application 50 via the OS 40. The print application 50 can thereby obtain the URI 300. Since the URI scheme is used as described, the print application 50 can suitably obtain the URI 300. Then, the print application 50 obtains the unique ID "xxxyyyzzz" from the query string 320 included in the URI 300. In other words, the print application 50 obtains the MAC address "xxxyyyzzz" of the printer 100.

Next, in T572, the print application 50 obtains the public key PPK1 of the printer 100 by hashing the obtained unique ID "xxxyyyzzz" in accordance with a predetermined hashing calculation. Since the public key PPK1 is obtained by hashing the unique ID (i.e., the MAC address) of the printer 100, the unique ID can be considered as information related to the public key PPK1. In the present embodiment, the unique ID "xxxyyyzzz" in the URI 300 represented by the QR code of the sticker 100B of the printer 100 is not the public key PPK1 of the printer 100 per se. That is, the QR code does not represent the public key PPK1 itself. Due to this, security for the public key PPK1 (in other words, security for the printer 100) is high as compared to a configuration in which the QR code represents the public key PPK1 itself.

The BS is terminated when T572 is completed. After this, as described above, the print application 50 executes the Auth of FIG. 5 (i.e., T30 of FIG. 3) by using the public key PPK1 and the MAC address "xxxyyyzzz", and further executes the Config of FIG. 6 (i.e., T35 of FIG. 3).

(Effects of Embodiment)

According to the present embodiment, the user of the terminal 10 can activate the print application 50 (T562 of FIG. 7) by simply performing the operation of selecting the application store button 404 in the web page 400 (T560), as a result of which the wireless communication according to the DPP scheme is executed with the printer 100 in accordance with the print application 50 and a Wi-Fi connection is established between the printer 100 and the AP 6. As such, the user does not have to select the icon of the print application 50 from among a plurality of icons displayed on the terminal 10 to activate the print application 50, for example. Thus, the user can easily establish the Wi-Fi connection between the printer 100 and the AP 6 by using the terminal 10.

(Corresponding Relationships)

The DPP scheme is an example of "predetermined communication scheme". The printer 100 and the AP 6 are an example of "a pair of devices". The camera application 42, the browser application 44, and the print application 50 are respectively examples of "computer program", "browser program", and "connection application". The unique ID (i.e., the MAC address "xxxyyyzzz") is an example of "related information". The operation of selecting the application store button 404 is an example of "predetermined operation". The communication executed in the Config of FIG. 6 is an example of "target communication". The DPP OFF state and the DPP ON state are respectively examples of "incommunicable state" and "communicable state". The message 402 in the web page 400, the operation of pressing the Wi-Fi button of the printer 100 three times, and the model name "AAA" are respectively examples of "specific message", "specific change operation", and "specific model information". The calculation for the hashing is an example of "predetermined calculation". The printer CO in T310 of FIG. 6 is an example of "connection information".

The process of T522, the process of T530, the process of T536, the process of T540, the process of T562, and the process of T572 of FIG. 7 are examples of "obtain location information of the server and related information related to a public key of the communication device by using the computer program", "send a web page request", "receive web page data", "display a web page", "activate the connection application", and "obtain the public key", respectively. The process of T210 and the process of T220 of FIG. 5 are examples of "send an authentication request" and "receive an authentication response", respectively. Each communication of FIG. 6 is an example of "execute a target communication" of "the terminal".

The process of T534 and the process of T536 of FIG. 7 are examples of "extract the specific message" and "send the web page data", respectively.

The process of T210 and the process of T220 of FIG. 5 are examples of "receive an authentication request" and "send an authentication response", respectively. Each communication of FIG. 6 is an example of "execute a target communication" of "the communication device". The process of T552 of FIG. 7 is an example of "change the state of the communication device".

Second Embodiment

Next, a second embodiment will be described. The description for features that are identical to those of the first embodiment will be omitted. In the present embodiment, the sticker 100B is not attached to the housing 100A of the printer 100. The printer 100 is provided with a display unit 114 (see FIGS. 1 and 2) capable of displaying a QR code. Further, the server 200 is not provided with the model table 250 (see FIG. 2).

In the present embodiment, a BS of FIG. 8 is executed instead of the BS of FIG. 7. The user performs a DPP activation operation on the printer 100 in T600. This operation may, for example, be an operation of selecting a DPP button in the operation unit 112 or an operation of selecting a DPP button in a setting screen displayed on the display unit 114. In a case of accepting this operation, the printer 100 changes from the DPP OFF state to the DPP ON state in T602.

Next, in T604, the printer 100 creates a QR code and displays this QR code on the display unit 114. The QR code is created by coding a URI 350. The URI 350 includes a location character string 360 and a query string 370. The location character string 360 includes the location information "server.com" of the server 200. The query string 370 includes a character string "id=xxxyyyzzz20190801154540" indicating a unique ID "xxxyyyzzz20190801154540" of the printer 100 and the character string "printapplication" identifying the print application 50. In the present embodiment, the unique ID is a combination of the MAC address "xxxyyyzzz" of the printer 100 and the current date and time "20190801154540 (i.e., Aug. 1, 2019, 15:45:40)". In T604, the printer 100 creates the unique ID by combining the MAC address of the printer 100 and the current date and time, creates the URI 350 including this unique ID, and codes this URI 350 to create the QR code.

T610 to T630 are similar to T510 to T530 of FIG. 7 except that the content of the URI is different. Since the server 200 is not provided with the model table 250 in the present embodiment, it sends, to the terminal 10, web page data representing a web page that does not include a message for changing the printer 100 to the DPP ON state in T636.

When receiving the web page data from the server 200 in T636, the browser application 44 displays a web page 450 represented by the web page data on the display unit 14 in T640. The web page 450 does not include the aforementioned message, but includes an application store button 454.

T660 and T662 are similar to T560 and T562. In T670, the print application 50 obtains the URI 350 by using the URI scheme, and obtains the unique ID "xxxyyyzzz20190801154540" from the query string 370. Then, the print application 50 obtains the MAC address of the printer 100 by extracting the character string "xxxyyyzzz" from the unique ID, excluding the character string indicating the date and time.

T672 is similar to T572 of FIG. 7 except that the unique ID to be hashed is different. Due to this, the print application 50 can obtain the public key PPK1. In the present embodiment, the printer 100 does not have the public key PPK1 stored in advance at the time of shipping of the printer 100, but creates the public key PPK1 by hashing the unique ID created in T604. That is, the printer 100 can create a different public key each time it changes from the DPP OFF state to the DPP ON state. Due to this, the security for the public key of the printer 100 (i.e., the security of the printer 100) is high.

(Effects of Embodiment)

According to the present embodiment as well, the user can easily establish a Wi-Fi connection between the printer 100 and the AP 6 by using the terminal 10. In this embodiment, the process of T602 is an example of "change the state of the communication device". The process of T604 is an example of "execute an output control process".

(Variant 1) In the case of FIG. 3, the terminal 10 uses the SSID "sss" and the password "ttt" of the AP 6 to establish the Wi-Fi connection with the AP 6. Instead of this, the terminal 10 may execute wireless communication of the DPP scheme to establish the Wi-Fi connection with the AP 6. That is, the AP 6 may support the DPP scheme and have a QR code indicating a public key of the AP 6 (for example, a sticker thereof may be attached to a housing of the AP 6). By capturing an image of this QR code, the terminal 10 obtains the public key of the AP 6 (i.e., executes the BS). After this, the terminal 10 executes Auth and Config with the AP 6 similar to FIGS. 5 and 6. In this case, however, the terminal 10 creates an AP CO including an AP Signed Connector (hereinbelow, Signed Connector will be termed "SC") in the Config and sends a CRes including the AP CO. Further, the terminal 10 creates a terminal SC. Then, the terminal 10 and the AP 6 execute a Network Access (hereinbelow termed "NA") by using the terminal SC and the AP SC to share a connection key, and establish the Wi-Fi connection by using the connection key. After this, the terminal 10 executes the BS, the Auth, and the Config (see FIGS. 4 to 6) with the printer 100. In this case, however, the terminal 10 does not create the printer CO including the SSID and the password in the Config, but instead creates a printer CO including a printer SC and sends a CRes including the printer CO to the printer 100. In this case, the printer 100 and the AP 6 execute the NA by using the printer SC and the AP SC to share a connection key, and establish the Wi-Fi connection by using the connection key. In this variant, the printer SC is an example of "connection information".

(Variant 2) A method of "obtain the public key" related to the related information is not particularly limited. For example, any of variants 2-1 to 2-4 as below may be employed.

(Variant 2-1) In T570 of FIG. 7, the print application 50 may obtain the URI 300 by using a so-called clipboard (i.e., a temporary storage region). That is, the OS 40 copies the URI 300 included in the web page data, in response to the user selecting a button (not shown) that is included in the web page for storing the URI 300 in a clipboard. Then, the print application 50 accesses the clipboard to obtain the URI 300. Then, the print application 50 obtains the unique ID from the URI 300 and obtains the public key PPK1 from the unique ID.

(Variant 2-2) In T572 of FIG. 7, the print application 50 may not hash the unique ID on its own, and may send the unique ID to a calculation server. In this case, the calculation server hashes the unique ID to create the public key PPK1. Then, the print application 50 obtains the public key PPK1 from the calculation server.

(Variant 2-3) The server 200 may extract the unique ID from the URI 300 included in the web page request received in T530 of FIG. 7, hash the unique ID to create the public key PPK1, and store the public key PPK1 in a specific storage region in the memory 234. In this case, the server 200 sends, to the terminal 10, web page data that does not include the unique ID but includes a link URI for accessing the specific storage region in T536. Then, the print application 50 accesses the specific storage region in the server 200 by using the link URI to obtain the public key PPK1 from the server 200.

(Variant 2-4) The URI 300 of FIG. 7 may not include the query string 320. In this case, the information described as the query string 320 (i.e., the unique ID, etc.) may be included in the QR code as information different from the URI 300. In this case, in T522, the unique ID, etc. are stored in a predetermined storage region of the memory 34. The web page request of T530 and the web page data of T536 do not include the unique ID, etc. The print application 50 accesses the predetermined storage region in T570 to obtain the unique ID, etc. Then, the print application 50 obtains the public key PPK1 from the unique ID.

(Variant 3) The unique ID may not be the MAC address, and may be the public key PPK1 itself. In this variant as well, the unique ID is an example of "related information related to a public key".

(Variant 4) The Wi-Fi connection may not be established between the terminal 10 and the AP 6. In this case, the terminal 10 executes the respective processes of T25 to T35 of FIG. 3, operates as the Configurator in T35, creates the printer CO including the printer SC, and sends the CRes including the printer CO to the printer 100. Further, the terminal 10 creates a terminal CO including a terminal SC. Then, the terminal 10 and the printer 100 execute the NA by using the terminal SC and the printer SC to share a connection key, and establish a Wi-Fi connection by using the connection key. In this variant, the printer SC is an example of "connection information". Further, the terminal 10 and the printer 100 are an example of "a pair of devices".

(Variant 5) The Wi-Fi connection may not be established between the terminal 10 and the AP 6. Instead, a Wi-Fi connection may be established between the printer 100 and the AP 6. In this case, the terminal 10 executes the respective processes of T25 to T35 of FIG. 3, operates as the Enrollee in T35, and receives the CRes that includes the terminal CO including the terminal SC from the printer 100. Then, the terminal 10 and the AP 6 execute the NA by using the terminal SC and the AP SC to share a connection key, and establish a Wi-Fi connection by using the connection key. In this variant, the terminal SC is an example of "connection information", and the terminal 10 and the AP 6 are an example of "a pair of devices". Further, as in the present variant, "execute a target communication" of "the terminal" may include executing a target communication including receiving the connection information from the communication device.

(Variant 6) In T604 of FIG. 8, the printer 100 may cause the print executing unit 118 to print the QR code, instead of displaying the QR code. In this variant, this process of causing the print executing unit 118 to print the QR code is an example of "output control process".

(Variant 7) Each of the terminal 10 and the printer 100 may further be provided with a wireless interface (such as a BT (Bluetooth (registered trademark)) I/F, a NFC (Near Field Communication) I/F, etc.) according to a wireless scheme different from the Wi-Fi scheme (such as a BT scheme, an NFC scheme, etc.). In this case, in T604 of FIG. 8, the printer 100 may instruct the BT I/F of the printer 100 to send the URI 350. In this case, the terminal 10 can receive the URI 350 via the BT I/F of the terminal 10. In this variant, instructing the BT I/F to send the URI 350 is an example of "output control process". Further, in another variant, the printer 100 may store the URI 350 in the NFC I/F of the printer 100 in T604 of FIG. 8. In this case, the terminal 10 can receive the URI 350 via the NFC I/F of the terminal 10. In this variant, storing the URI 350 in the NFC I/F is an example of "output control process". In these variants, a program configured to execute communication of the BT scheme and a program configured to execute communication of the NFC scheme are examples of "computer program".

(Variant 8) The "computer program" and "browser program" may not be separate programs, but may be one program (i.e., one application).

(Variant 9) The trigger for the process of T602 in FIG. 8 may not be the DPP activation operation of T600, and may be a power-ON operation of the printer 100, for example. That is, "change the state of the communication device" may include changing the state of the communication device from the incommunicable state to the communicable state before an execution instruction of the output control process is accepted.

(Variant 10) The terminal 10 and the printer 100 may not support the DPP scheme, and may support another scheme for establishing a Wi-Fi connection by using a public key, an authentication request, and an authentication response. Generally speaking, "predetermined communication scheme" is not limited to the DPP scheme.

(Variant 11) The "communication device" may not be the printer 100, and may be another device such as a scanner, a multi-function device, a portable terminal, a PC, or a server.

(Variant 12) In the above embodiments, the respective processes of FIGS. 3 to 8 are implemented by software, however, at least one of these processes may be implemented by hardware such as a logic circuit.

What is claimed is:

1. A communication system comprising:
a communication device;
a terminal; and
a server,
wherein the terminal comprises:
a terminal-side wireless interface configured to execute a wireless communication according to a predetermined communication scheme of Wi-Fi standard;
a display unit;
a terminal-side processor; and
a terminal-side memory storing a computer program, a browser program, and a connection application for establishing a wireless connection between a pair of devices,
wherein the computer program includes computer-readable instructions configured to, when executed by the terminal-side processor, cause the terminal to:
obtain location information of the server and related information related to a public key of the communication device,
wherein the browser program includes computer-readable instructions configured to, when executed by the terminal-side processor, cause the terminal to:
send a web page request including at least the location information to the server;
receive web page data corresponding to the location information from the server in response to the web page request being sent to the server;
display a web page represented by the web page data on the display unit; and
activate the connection application in a case where a predetermined operation is accepted on the displayed web page, wherein the connection application includes computer-readable instructions configured to, when executed by the terminal-side processor, cause the terminal to:
obtain the public key related to the related information;
send an authentication request according to the predetermined communication scheme to the communication device via the terminal-side wireless interface, the public key being used in the authentication request;
receive an authentication response according to the predetermined communication scheme from the communication device via the terminal-side wireless interface in response to the authentication request being sent to the communication device; and in a case where the authentication response is received from the communication device, execute a target communication according to the predetermined communication scheme with the communication device via the terminal-side wireless interface, the target communication being for establishing a wireless connection between a pair of devices; and wherein the displayed web page includes a specific message indicating a specific change operation, the specific change operation being for changing a state of the communication device from an incommunicable state to a communicable state, the incommunicable state being a state in which a wireless communication according to the predetermined communication scheme is incapable of being executed, the communicable state being a state in which a wireless communication according to the predetermined communication scheme is capable of being executed, the communication device comprises:

a device-side wireless interface configured to execute a wireless communication according to the predetermined communication scheme;

a device-side processor; and a device-side memory storing computer-readable instructions therein, wherein the computer-readable instructions in the device-side memory are configured to, when executed by the device-side processor, cause the communication device to:

in a case where the specific change operation is accepted, change the state of the communication device from the incommunicable state to the communicable state;

receive the authentication request from the terminal via the device-side wireless interface;

in a case where the authentication request is received from the terminal after the state of the communication device has been changed from the incommunicable state to the communicable state, send the authentication response to the terminal via the device-side communication interface, wherein the authentication response is not sent before the state of the communication device is changed from the incommunicable state to the communicable state; and in a case where the authentication response is sent to the terminal, execute the target communication according to the predetermined communication scheme with the terminal via the device-side wireless interface.

2. The communication system as in claim 1, wherein the computer-readable instructions in the computer program are configured to, when executed by the terminal-side processor, further cause the terminal to:

obtain specific model information indicating a model of the communication device, wherein the web page request including at least the location information and the specific model information is sent to the server, and the server comprises:

a server-side processor; and a server-side memory that stores, for each of a plurality model information, the model information and a message in association with each other, the message indicating a specific change operation for changing a state of a device corresponding to the model information from the incommunicable state to the communicable state, wherein the server-side memory further stores computer-readable instructions therein, and the computer-readable instructions in the server device-side memory is configured to, when executed by the server-side processor, cause the server to:

in a case where the web page request is received from the terminal, extract, from the server-side memory, the specific message that indicates the specific change operation and is associated with the specific model information included in the web page request; and send the web page data representing the web page including the extracted specific message to the terminal.

3. A non-transitory computer-readable recording medium storing a connection application for a terminal, wherein the terminal comprises:

a terminal-side wireless interface configured to execute a wireless communication according to a predetermined communication scheme of Wi-Fi standard;

a display unit;

a terminal-side processor; and a terminal-side memory storing a computer program, a browser program, and the connection application for establishing a wireless connection between a pair of devices, wherein the computer program includes computer-readable instructions configured to, when executed by the terminal-side processor, cause the terminal to:

obtain location information of a server and related information related to a public key of a communication device, wherein the browser program includes computer-readable instructions configured to, when executed by the terminal-side processor, cause the terminal to:

send a web page request including at least the location information to the server;

receive web page data corresponding to the location information from the server in response to the web page request being sent to the server;

display a web page represented by the web page data on the display unit; and activate the connection application in a case where a predetermined operation is accepted on the displayed web page, wherein the connection application includes computer-readable instructions configured to, when executed by the terminal-side processor, cause the terminal to:

obtain the public key related to the related information;

send an authentication request according to the predetermined communication scheme via the terminal-side wireless interface, the public key being used in the authentication request;

receive an authentication response according to the predetermined communication scheme from the communication device via the terminal-side wireless interface in response to the authentication request being sent to the communication device; and in a case where the authentication response is received from the communication device, execute a target communication according to the predetermined communication scheme with the communication device via the terminal-side wireless interface, the target communication being for establishing a wireless connection between a pair of devices; and wherein the displayed web page includes a specific message indicating a specific change operation, the specific change operation being for changing a state of the communication device from an incommunicable state to a communicable state, the incommunicable state being a state in which a wireless communication according to the predetermined lined communication scheme is incapable of being executed, the communicable state being a state in which a wireless communication according to the predetermined communication scheme is capable of being executed, the communication device comprises:

a device-side wireless interface configured to execute a wireless communication according to the redetermined communication scheme;

a device-side processor; and a device-side memory storing computer-readable instructions therein, wherein the computer-readable instructions in the device-side memory are configured to, when executed by the device-side processor, cause the communication device to:

in a case where the specific change operation is accepted, change the state of the communication device from the incommunicable state to the communicable state;

receive the authentication request from the terminal via the device-side wireless interface;

in a case where the authentication request is received from the terminal after the state of the communication device has been changed from the incommunicable state to the communicable state, send the authentication response to the terminal via the device-side communication interface, wherein the authentication response is not sent before the state of the communication device is changed from the incommunicable state to the communicable state; and in a case where the authentication response is sent to the terminal, execute the target communication according to the predetermined communication scheme with the terminal via the device-side wireless interface.

4. The non-transitory computer-readable recording medium according to claim 3, wherein the public key is obtained by executing a predetermined calculation using the related information.

5. The non-transitory computer-readable recording medium according to claim 3, wherein the target communication includes sending connection information to the communication device, and the connection information is for establishing the wireless connection between the pair of devices which are the communication device and an access point.

6. The non-transitory computer-readable recording medium according to claim 3, wherein the web page request includes at least the location information and the related information, the web page data includes the related information, and the public key is obtained using the related information included in the web page data.

7. The non-transitory computer-readable recording medium according to claim 3, wherein the location information and the related information are obtained by obtaining a Uniform Resource Identifier (URI) including the location information and the related information which is described as a query string.

8. A communication device comprising:

a device-side wireless interface configured to execute a wireless communication according to a predetermined communication scheme of Wi-Fi standard;

a housing to which a sticker indicating a code image is attached, wherein the code image is obtained by coding location information of a server and related information related to a public key of the communication device, the location information is used for a terminal to receive web page data from the server and to display a web page represented by the web page data, in a case where a predetermined operation is accepted on the displayed web page, a connection application installed in the terminal is activated, and the connection application is for obtaining the public key related to the related information and establishing a wireless connection between a pair of devices;

a device-side processor; and a device-side memory storing computer-readable instructions therein, wherein the computer-readable instructions are configured to, when executed by the device-side processor, cause the communication device to:

receive an authentication request according to the predetermined communication scheme via the device-side wireless interface from the terminal that has obtained the public key, the public key being used in the authentication request;

in a case where the authentication request is received from the terminal, send an authentication response to the terminal via the device-side wireless interface; and in a case where the authentication response k sent to the terminal, execute a target communication according to the predetermined communication scheme with the terminal via the device-side wireless interface, the target communication being for establishing a wireless connection between a pair of devices; and wherein the displayed web page includes a specific message indicating a specific change operation, the specific change operation being for changing a state of the communication device from an incommunicable state to a communicable state, the incommunicable state being a state in which a wireless communication according to the predetermined communication scheme is incapable of being executed the communicable state being a state in which a wireless communication according to the predetermined communication scheme is capable of being executed, wherein the computer-readable instructions are configured to, when executed by the device-side processor, further cause the communication device to: in a case where the specific change operation is accepted, change the state of the communication device from the incommunicable state to the communicable state, wherein in a case where the authentication request is received from the terminal after the state of the communication device has been changed to the communicable state from the incommunicable state the authentication response is sent to the terminal, and the authentication request is not sent before the state of the communication device is changed from the incommunicable state to the communicable state.

9. The communication device according to claim 8, wherein the related information includes a MAC address of the device-side wireless interface, and the public key is a value obtained by executing a predetermined calculation using the related information.

10. The communication device according to claim 8, wherein the target communication includes receiving connection information from the terminal, and the connection information is for establishing the wireless connection between the pair of devices which are the communication device and an access point.

11. A communication device comprising:
a device-side wireless interface configured to execute a wireless communication according to a predetermined communication scheme of Wi-Fi standard;
a device-side processor; and
a device-side memory storing computer-readable instructions therein,
wherein the computer-readable instructions are configured to, when executed by the device-side processor, cause the communication device to:
execute an output control process for externally outputting location information of a server and related information related to a public key of the communication device,
wherein the location information is used for a terminal to receive web page data from the server and to display a web page represented by the web page data,
in a case where a predetermined operation is accepted on the displayed web page, a connection application installed in the terminal is activated, and
the connection application is for obtaining the public key related to the related information and establishing a wireless connection between a pair of devices;
receive an authentication request according to the predetermined communication scheme via the device-side wireless interface from the terminal that has obtained the public key, the public key, being used in the authentication request;
in a case where the authentication request is received from the terminal, send an authentication response to the terminal via the device-side wireless interface; and
in a case where the authentication response is sent to the terminal, execute a target communication according to the predetermined communication scheme with the terminal via the device-side wireless interface, the target communication being for establishing a wireless connection between a pair of devices; and
wherein the computer-readable instructions are configured to, when executed by the device-side processor, further cause the communication device to: in a case where an execution instruction of the output control process is accepted on the displayed web page, change a state of the communication device from an incommunicable state to a communicable state, the incommunicable state being a state in which a wireless communication according to the predetermined communication scheme is incapable of being executed, the communicable state being a state in which a wireless communication according to the predetermined communication scheme is capable of being executed, in a case where the authentication request is received from the terminal after the state of the communication device has been changed to the communicable state from the incommunicable state, the authentication response is sent to the terminal, wherein the authentication request is not sent before the state of the communication device is changed from the incommunicable state to the communicable state.

12. The communication device according to claim 11, wherein
the related information includes a MAC address of the device-side wireless interface, and
the public key is a value obtained by executing a predetermined calculation using the related information.

13. The communication device according to claim 11, wherein
the target communication includes receiving connection information from the terminal, and
the connection information is for establishing the wireless connection between the pair of devices which are the communication device and an access point.

* * * * *

UNITED STATES PATENT AND TRADEMARK OFFICE
CERTIFICATE OF CORRECTION

| | | |
|---|---|---|
| PATENT NO. | : 11,134,529 B2 | Page 1 of 1 |
| APPLICATION NO. | : 17/006160 | |
| DATED | : September 28, 2021 | |
| INVENTOR(S) | : Syun Takeuchi | |

It is certified that error appears in the above-identified patent and that said Letters Patent is hereby corrected as shown below:

In the Claims

Column 19, Claim 3, Line 3 should read:
according to the predetermined communication Column 19, Claim 3, Line 10 should read:
wireless communication according to the predetermined Column 20, Claim 8, Line 27 should read:
in a case where the authentication response is sent to the Column 20, Claim 8, Line 40 should read:
is incapable of being executed, the communicable state Column 20, Claim 8, Line 53 should read:
municable state, the authentication response is sent to Signed and Sealed this
Twenty-seventh Day of June, 2023

Katherine Kelly Vidal
*Director of the United States Patent and Trademark Office*